United States Patent Office 2,952,694
Patented Sept. 13, 1960

2,952,694

ENHANCED PHOSPHATIDE PRODUCTS

Douglas J. Hennessy, Teaneck, and Raymond J. Moshy, Lodi, N.J., assignors to American Lecithin Company, Inc., Woodside, N.Y., a corporation of Ohio No Drawing. Filed Apr. 29, 1957, Ser. No. 655,477

The terminal portion of the term of the patent subsequent to May 7, 1974, has been disclaimed 1 Claim. (Cl. 260—403)

The present invention relates to novel peroxidized sulfonated phosphatides.

It is among the particular objects of the present invention to develop peroxidized sulfonated phosphatides, which will greatly increase miscibility in various solvents and particularly in aqueous compositions or water and at the same time substantially preserve and retain the organic complex or molecular structure without substantial destruction, charring or breaking down into simpler or less complex molecular structures or polymerization into tarry or gummy more complex structures.

It has been found that when phosphatides or lecithin are treated with even weak sulphonating agents, the phosphatide or lecithin tends to break down and a great deal of charring takes place with the result that products of no commercial value are produced and the charred material has few, if any, of the desirable emulsifying and blending characteristics of the original phosphatide complex.

This is true even where very weak sulphonating agents are employed, such as organic solvent complexes of the sulfur trioxide as with dioxane or ethylene chloride.

Furthermore it has also been found that treatment of phosphatides or lecithin with peracetic acid, perlactic acid or even hydrogen peroxide does not substantially enhance the miscibility or emulsification properties of the phosphatide or lecithin complex.

Now, surprisingly, it has been found that a preliminary treatment with peracetic or perlactic acid or a similar perfatty acid which is water soluble followed by treatment with a weak sulphonating agent, will give rise to phosphatides or lecithin having substantially the same or greater molecular weight than the original phosphatides or lecithin complex and which at the same time, has unusual and most effective miscibility and emulsification properties.

It has been found most satisfactory to utilize lecithin particularly in the form in which it is extracted from soya bean or corn oil containing from 25% to 50% of the original oil material.

Lecithin either in substantially oil-free form or in its commercial composition in which there is a mixture of about 67% of lecithin and 33% of soya bean oil cannot be widely utilized because it is difficult to disperse it or dissolve it in water or aqueous media.

Lecithin or phosphatides normally will not readily mix in other fluids and there is considerable difficulty in obtaining dispersions thereof, and because of its resistance to miscibility with water or aqueous liquids, the possibilities of its usefulness in lubricating or grinding oils, in the preparation of aqueous dispersions and stable emulsions and in the treatment of textiles or in processes of pigment wetting are quite limited.

Vegetable lecithin or natural phosphatides normally are very complex mixtures, particularly when derived from soya beans or even corn, and said mixtures are composed of the phosphatide lecithin, some fat usually in the form of soya bean or other glyceride oil, lipositol, cephalin carbohydrate and the like.

Wherever lecithin is referred to hereinafter, it will be understood to include also other phosphatides, similar mixtures or related organic compositions having chemical structural features similar to those present in lecithin.

It has been found readily possible to treat this mixture successively with dilute peracetic acid and then with weak sulfur trioxide to enhance its solubility or water miscibility while retaining the reactivity of the lecithin and related components and without degrading or breaking down or polymerizing the lecithins into undesirable products with excessive charring.

It is among the objects of the present invention to provide a novel lecithin either in crude or oil-free condition in which the miscibility and other dispersibility of the lecithin is greatly increased without substantial degradation, charring or breaking down or polymerization and without excessive splitting or destruction at the double bonds or other unsaturated linkages therein.

Another object of the present invention is to provide an improved, solubilized lecithin retaining in substantially full strength its oily and lubricating properties and its surface contact effect, while at the same time being substantially miscible with water to provide emulsions of great stability and aqueous dispersions of enhanced value without the necessity of utilizing expensive synthetic emulsifying agents.

Another object is to provide a modified commercial or crude lecithin without substantial loss in its phosphatide properties which is readily miscible in water or aqueous media.

A further object is to prepare a modified lecithin which will be effective as a detergent in lubricating oils which will enhance lubricity and positive effect in grinding oils, which will facilitate the preparation of aqueous dispersions and emulsions of great stability, and which may be employed for treating textiles and greatly to increase the speed of pigment wetting by solvents or oils.

A still further object of the present invention is to provide peracylated hydroxylated and epoxylated lecithin or phosphatide which will be largely or substantially free of charred by-products, which will be highly dispersible in aqueous or organic liquids and which has particular utility as an additive in lubricating oils and in gasoline or diesel fuels and for use in fat liquoring used by leather tanners.

Still another object is to provide a modified lecithin or phosphatide which will partly serve as a detergent in aqueous fluids as well as in oils, as an agent to increase the sweat point of hard vegetable butters and as an emulsifying and stabilizing agent which when added to aqueous fluids will resist acid precipitation.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable, according to one embodiment of the present invention, to treat the lecithin composition, and preferably an oil-free lecithin, with peroxidizing agents which will have a weak or limited oxidizing action thereon.

Among the preferred oxidizing agents of this character are peracetic acid, perlactic acid or perpropionic acid or even hydrogen peroxide, in general various types of percompounds of organic or inorganic nature may be employed under such temperature, pH, and concentration conditions, as to give a limited chemical reaction upon the active bonds of lecithin or other similar organic compositions.

For the next step, sulfur trioxide is employed in the presence of organic solvents or liquids which will reduce its activity and enable most effective action upon the organic composition such as lecithin.

Among the preferred organic solvents are those which form complexes with the sulfur trioxide, such as chlorinated hydrocarbons, particularly ethylene dichloride and oxygenated ring compounds such as, dioxane and also polyethers having two or more ether linkages. Less preferably, saturated or unsaturated hydrocarbon solvents may be employed.

Desirably, much less than 50% of the double bonds or unsaturated linkages are combined with the sulfur groups, and preferably from 2% to 25% are so combined with the —$SO_4$ or —$OSO_3H$ group. In the preferred procedure about 15 to 20% of the double bonds are sulfated or sulfonated.

Desirably, the sulfating or sulfonation takes place in the absence of water and in the presence of organic liquid or solvent.

Among the preferred organic solvents are ethylene dichloride, methylene dichloride, propylene dichloride, tetrachloride, dioxane, dichlorethyl ether, ethylene glycol diethyl ether, dimethoxytetraglycol, dichlorethyl formal, dichlorisopropyl ether, triglycol dichloride and ethylene glycol diethyl ether and acetic acid.

In one form of the invention, an ethylene dichloride-sulfur trioxide complex is added after treatment of a solution of lecithin dissolved in a composition of glacial acetic acid with a per acid, preferably peracetic acid.

The lecithin is desirably used in the form of a liquid containing 1% to 2% of free fatty acid and about 30% to 35% of soya bean oil.

*Example I*

To prepare a sulfonated lecithin, 100 parts of liquid commercial lecithin is reacted with 5 parts of 40% peracetic acid.

To this reaction mixture there is added with good mixing an ethylene chloride-sulfur trioxide complex which contains about 5 parts of sulfur trioxide in each 10 to 12 parts of ethylene dichloride, all parts being by weight.

This ethylene dichloride-sulfur trioxide compound is produced by adding sulfur trioxide in liquid or polymerized form in small quantities to the ethylene dichloride which is chilled with thorough stirring.

After the ethylene dichloride and sulfur trioxide has completed its action upon the lecithin, the mixture is neutralized with an organic or inorganic base.

During this treatment the temperature should be kept below 45° C. and after all of the ethylene dichloride-sulfur trioxide has been added, the reaction mixture may be allowed to come to room temperature with external cooling.

*Example 2*

A solution of 88 grams of dry dioxane in 250 to 300 ml. ethylene chloride is cooled to 4° to 8° C. in an ice bath.

To this is added, with stirring, 80 grams of sulfur trioxide. The sulfur trioxide is added at such a rate that the reaction temperature does not exceed 20° C. After the addition has been completed, the mixture is cooled and the white, crystalline dioxane-sulfur trioxide complex is separated from the supernatant liquid and left suspended as a slurry in the residual liquid.

40 grams of 40% peracetic acid dissolved in glacial acetic is added to 1 kilogram of liquid lecithin, preferably a 67%–33% soya oil mixture, with efficient mixing. The addition is at such a rate that the temperature is always kept below 45° to 50° C. This usually requires about one-half hour. The lecithin is now lemon yellow and somewhat more fluid. The mixture is stirred for at least one-half hour more or allowed to stand for an hour.

100 grams of solid or slurry of dioxane-sulfur trioxide is added in 25 gram portions over a period of 1 to 1½ hours while mixing. The reaction temperature is maintained below 50° C.

There is a darkening of the lecithin where the solid first touches but the discoloration rapidly disappears. After the addition is complete the mixture is a gold or honey colored mass.

On cooling the mixture becomes quite viscous—more so than the original lecithin.

The neutralization is carried out as soon as possible and desirably within 2 hours after completion of the sulfonation to prevent darkening. The mixture is neutralized with 60% KOH added at such a rate that the temperature does not exceed 45° to 50° C. Local excess of base is to be avoided so as to minimize saponification of the glyceride and to prevent darkening. The base is added until a pH of 6.5 to 7 is reached when a 5% dispersion of the product is made in water.

The product produced is a fluid clear, honey colored and water dispersible composition having the general appearance, bulk and plasticity of lecithin, and yet is readily dispersible in water and acts as a particularly effective detergent in lubricating oils. In itself it will act to give emulsions and aqueous dispersion of great stability and it may be used for finishing or otherwise treating textiles and to increase the speed of pigment wetting or wetting of carbon black by solvents of oils.

*Example 3*

4% by weight of 40% peracetic acid is added, with vigorous mixing, to liquid lecithin. The temperature is maintained between 35° C. to 55° C.

To this mixture 10% by weight of crystalline dioxane-sulfur trioxide, or 10% by weight of dioxane-sulfur trioxide as a slurry in a suitable solvent, e.g. ethylene chloride, is added in portions with vigorous mixing. Temperature is maintained between 25° and 50° C.

The mixture is neutralized with 60% potassium hydroxide to pH 6.5–7. The pH is measured on a 5% dispersion of the material in water at 25°. Water and solvent may be removed by vacuum drying if desired.

Among the various alkalies which may be employed for neutralization are powdered anhydrous potassium or sodium hydroxide, 50% sodium or potassium hydroxide solution, powdered hydrated or anhydrous barium hydroxide, a 60% slurry of barium hydroxide, concentrated or 28% ammonium hydroxide, anhydrous ammonia gas under pressure, organic amines such as, triethanolamine, triethylamine or dicyclohexyl amine.

In general, in Examples 1 to 3, neutralization may be carried out by use of a suitable inorganic or organic base either with or without water as a solvent for the base. This neutralization will also be a final step in each of the following examples:

*Example 4*

4% by weight of 40% peracetic acid is added with vigorous mixing to liquid lecithin.

Temperature is kept between 35° C. and 55° C.

To this mixture is added 5% by weight of dioxane-sulfur trioxide either in a dry crystalline form or as a slurry in a suitable solvent, such as ethylene chloride, with vigorous stirring. Temperature is maintained between 35° C. and 55° C.

Neutralization to pH 6.5–7 is effected with a suitable inorganic or organic base.

The same procedure may be employed using 20%, 30% and 35% of dioxane-sulfur trioxide with temperatures ranging from 20° to 35° C.

*Example 5*

8% by weight of 40% peracetic acid is added with vigorous mixing to liquid lecithin. Temperature is maintained between 35° C. and 55° C.

To this mixture is added 5% by weight of dioxane-sulfur trioxide either in dry crystalline form or as a slurry in a suitable solvent, such as ethylene chloride, with vigorous mixing. Temperature is maintained between 35° C. and 55° C.

Neutralization to pH 6.5-7 is effected with a suitable inorganic or organic base.

Similarly instead of using 5% of dioxane sulfur trioxide it is possible to use 10%, 20%, 30% or 35%, preferably with a lower temperature as the percentage increases, ranging down to 20° C.

In general, the amount of peracetic acid may be varied from 2% to 15% by weight and the dioxane sulfur trioxide may be varied from 5% to 35% by weight.

*Example 6*

2½% by weight of 40% hydrogen peroxide is added dropwise to liquid lecithin with vigorous mixing. To this mixture is added 10% by weight of dioxane-sulfur trioxide with vigorous mixing. Temperature is kept between 20° C. and 30° C. Neutralization is effected with a sutable inorganic or organic base.

In the above examples where dioxane-sulfur trioxide is employed it may be replaced with ethylene dichloride-sulfur trioxide or mixtures may be utilized.

Referring to the above procedures, the preferred method employed to sulfonate lecithin was to add 10% ethylene dichloride-sulfur trioxide or crystalline dioxane-sulfur trioxide to liquid lecithin, which had been first treated with 4% by weight of 40% peracetic acid. The product was then neutralized with a concentrated solution of sodium hydroxide, potassium hydroxide or some liquid organic amine.

*Example 7*

Lecithin was also treated with 5% peracetic acid and 5%, 10% or 20% dioxane-sulfurtrioxide and then neutralized with potassium hydroxide to pH 6.5-7.

Upon neutralization, however, all products lightened up considerably.

The preferred upper limits therefore would seem to be 20% dioxane-sulfur trioxide with 4% peracetic acid.

*Example 8*

Lecithin was treated, using hydrogen peroxide in place of peracetic acid.

2½% to 40% $H_2O_2$ (equivalent to 4% of 40% peracetic acid) was added to liquid lecithin dropwise with vigorous mixing. The mixture became more and more viscous and finally solidified. It resembled lecithin soap in consistency and texture. To this mixture 10% dioxane-sulfur trioxide was added. The product was light-colored and quite liquid. Neutralized with concentrated potassium hydroxide. As the pH rose, the viscosity increased, until at pH 7 the product was again semi-solid.

To summarize, 35% dioxane-sulfur trioxide is the upper limit when the per-treatment is first accomplished.

The amount of peracetic acid may be widely varied but should not exceed 15%.

Hydrogen peroxide or perpropionic acid may readily be used instead of peracetic acid on the above example.

Neutralization may be effected in all cases with concentrated solutions of alkali or with powdered alkali or with organic amines.

It has been found that successive treatments of a phosphatide, namely lecithin with peracetic acid, followed by treatment with a sulfonating agent will produce the above novel compounds which cannot be predicted from the compounds which are obtained by employing these successive treatments one at a time.

For example, when lecithin is treated with a sulfonating agent, there is strong charring and destruction.

However, when lecithin is first treated with peracetic acid a chemically changed lecithin results which can be sulfonated without charring at all.

Moreover, the final sulfonated lecithin is quite different from lecithin which has been sulfonated without a previous treatment with peracetic acid.

By comparing the sulfonated lecithin which has not been previously treated with the peracetic acid with the sulfonated lecithin which has been treated it is clear that altogether novel chemical compounds have been produced.

As compared with ordinary commercial lecithin, the sulfonated product emulsifies more readily with water. Furthermore, the water emulsion is not as readily precipitated in the presence of acid. The sulfonated lecithin is more effective in lubricating oils as a detergent and in addition, it imparts increased film strength to the oils. Whereas ordinary lecithin tends to lower the sweat point of hard vegetable butter, the addition of a fractional percentage of the sulfonated lecithin tends to increase the sweat point.

The modified lecithin is surprisingly superior as a detergent in lubricating oils, to improve lubricity and protective effect in grinding oils, to facilitate preparation of aqueous dispersions, to give emulsions of greater stability and as an improved material for treating textiles and to increase speed of pigment wetting by solvents or oils, especially such pigments as carbon black.

The products generally were viscous, golden brown to light brown and possessed agreeable odors and were water dispersible.

The modified lecithin is also surprisingly different in physical appearance, it is yellower without any trace of charring and has a honey-like consistency. That it is different in chemical composition clearly appears as a result of chemical tests.

A surprising effect results when a dilute solution of barium chloride is added. There appears to be a precipitation of the lecithin complex itself indicating that the modified lecithin of the present invention produces free sulphate ions and acts in a manner as in electrolyte.

On the other hand, a phosphatide or lecithin which has been sulfonated directly without the preliminary treatment with the acetic acid will not form a barium sulfate phosphatide indicating that there are no sulfate ions present.

The speed with which the modified product goes into solution or emulsion is also quite different.

The present peroxidized sulfonated phosphatides disperse very quickly in water whereas the lecithin treated with peracetic acid by itself, or by one of the above sulfur trioxide complexes by itself or without either treatment will disperse very slowly.

The same difference is observed in connection with solutions in peanut oil, soya bean oil, white mineral oil or other vegetable, animal or mineral oils.

In all these cases of peroxidized sulfonated phosphatides, the present lecithin disperses very readily and rapidly with mineral and vegetable oils as contrasted with the phosphatide or lecithin which has been untreated or only has been subjected to one of the treatments.

Whereas normally the sulfonation of lecithin or other phosphatides results in a charred, dark product of little value whereas with the peroxidized sulfonated phosphatides of the present invention is not charred, is of light color and rapidly miscible with water.

A minor proportion of the double bonds in the lecithin are combined and excessive dehydration of the lecithin is avoided. Desirably, to remove the excess solvent from the modified lecithin, a vacuum may be employed.

The final product is probably a hydroxylate, an epoxylate and sulfate of the original lecithin material, with increased intensity and prolongation of the process, resulting in more of the sulfate and less of the hydroxylate.

Based upon an assumption that there are 1½ double bonds per molecule of the lecithin, the above process will result in hydroxylation and epoxylation of about ¼ to ⅓ of these double bonds, although this may range from 1/10 to ½ of the double bonds. Preferably, about 5% to 10% of the double bonds are converted into hyroxylated, epoxylated or sulfated compounds. If desired, the lecithin before treatment may be subjected to a high pressure processing with ethylene oxide in the presence of such catalysts as sodium methylate or potassium ethylate. This may be followed by the above sulfation treatment.

Chlorinated, halogenated or oxygenated solvents are preferred to straight hydrocarbons such as benzene or petroleum ether for combination with the sulfur trioxide.

Straight hydrocarbons however, may be utilized, such as petroleum fractions, where the composition is to be added finally to gasoline or lubricating oil to improve their stability, since this will avoid the necessity of eliminating the solvent after the per-treatment and sulfonating treatment.

The modified lecithin produced as above may be used in lubricating oils as a detergent and also to enhance the film strength to various oils.

The product emulsifies more readily with water and the water emulsion is not as readily precipitated in the presence of an acid.

The addition of a small percentage of the above modified lecithin tends to increase the sweat point of hard vegetable butter as contrasted to ordinary lecithin, which lowers said sweat point. The lecithin may also be utilized in fat liquors employed in the tanning of leather.

The enhanced lecithin has greatly increased stabilizing effect and has better oily properties and is more readily miscible both in oil and water compositions or emulsions.

The sulfated lecithin may be readily added to bakery products to improve the blending and to favorably influence the quality of the finished products.

The sulfonated lecithin may be filtered with or without the presence of the solvent to remove insolubles.

Where the pH of the final product is determined, it is determined by testing an aqueous dispersion of the processed lecithin.

As many changes could be made in the above lecithin compositions and processes of producing the same, and many widely different embodiments of this invention could be made without departing from the scope of the claim, it is intended that all matter contained in the above description shall be interpreted as illustrative and not in a limited sense.

Having now particularly described and ascertained the nature of the invention, and in what manner the same is to be performed, what is claimed is:

A peracetylated sulfonated phosphatide having 15 to 20% of its double bonds sulfonated which is readily soluble in water and in vegetable and mineral oils and which will form emulsions of great stability whilst retaining the oily and lubricating properties and the surface contact effect of untreated phosphatide and which is a clear fluid honey colored composition having the general appearance, bulk and plasticity of the untreated phosphatide, said phosphatide in aqueous solution producing free sulfate ions, said phosphatide having one and one-half double bonds per molecule of lecithin and about one-quarter to one-half of these bonds being hydroxylated.

References Cited in the file of this patent

UNITED STATES PATENTS

| | | |
|---|---|---|
| 2,445,948 | Wittcoff | July 27, 1948 |
| 2,791,594 | Hennessy et al. | May 7, 1957 |